United States Patent
Mehrotra

(10) Patent No.: US 11,909,575 B1
(45) Date of Patent: Feb. 20, 2024

(54) CLOUD-CONNECTED BASEBOARD MANAGEMENT CONTROLLER

(71) Applicant: Microsoft Technology Licensing, LLC, Redmond, WA (US)

(72) Inventor: Sanjeev Mehrotra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/335,724

(22) Filed: Jun. 15, 2023

(51) Int. Cl.
*H04L 41/046* (2022.01)
*H04L 67/10* (2022.01)

(52) U.S. Cl.
CPC ............ *H04L 41/046* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2006/0129675 A1* | 6/2006 | Zimmer | ............. | H04L 67/1001 709/225 |
| 2013/0304903 A1* | 11/2013 | Mick | ......................... | G06F 9/44 709/224 |
| 2016/0013968 A1* | 1/2016 | Burns | ................... | H04L 41/048 709/224 |
| 2016/0188216 A1* | 6/2016 | Bi | ......................... | G06F 3/0674 710/313 |
| 2020/0252304 A1* | 8/2020 | Franke | ................ | H04L 41/0895 |
| 2023/0134324 A1* | 5/2023 | Emerson | ................. | G06F 21/33 726/26 |
| 2023/0246827 A1* | 8/2023 | Luciani, Jr. | ........... | G06F 9/4401 713/189 |

* cited by examiner

*Primary Examiner* — Quang N Nguyen
(74) *Attorney, Agent, or Firm* — Mark K. Young PC; Mark K. Young

(57) ABSTRACT

A cloud-connected baseboard management controller (BMC) enables remote management of all management layers of edge-based host machines from the cloud without imposition of costs associated with firewalls and private data connections. A remote management agent incorporated into the BMC enables creation of a remote management-enabled bare-metal server paradigm in which remote management from the cloud is supported at the lowest hardware levels which provides for cost-effective utilization of network resources down to even a single isolated node.

19 Claims, 15 Drawing Sheets

100

1300

CLOUD-CONNECTED BASEBOARD MANAGEMENT CONTROLLER

BACKGROUND

Information technology (IT) resources, such as compute and storage resources, are increasingly distributed into hybrid cloud environments including on-premises datacenters and third-party cloud providers. Customers using cloud-based management tools to configure and manage machines and clusters hosted in traditional cloud environments (e.g., large and regional datacenters) may wish to extend use of such tools for remote management scenarios in edge-computing environments in which resources are hosted outside cloud datacenters.

SUMMARY

Disclosed are a method, computer-readable storage device, and computing device configured to facilitate remote management of bare-metal host machines that are disposed in hybrid cloud computing environments such as near-edge and far-edge networks using a cloud-connected baseboard management controller (BMC). In an illustrative embodiment, a BMC instantiated in a bare-metal host machine (i.e., a machine supporting a single customer or tenant) provides for cloud-based remote control independently from an operating system (OS) on the machine. The BMC incorporates a remote management agent that is configured with credentials for identity verification with an external cloud-based endpoint. Once verified, the remote management agent is utilized to poll the cloud-based endpoint to obtain remote management instructions applicable to the bare-metal host machine. The BMC is operated to execute the remote management instructions on the bare-metal host machine.

In an illustrative embodiment, a polling endpoint is instantiated in a computing device in a cloud-based datacenter to provide remote management instructions to a bare-metal host machine over a network. In response to a request to the polling endpoint from a remote management agent operating on a BMC in a bare-metal host machine, the machine is verified as being associated with a customer subscription. In response to the verifying, remote management instructions are sent to the remote management agent in the BMC of the bare-metal host machine over the network.

In an illustrative embodiment, a computing device includes a communications bus, at least one processor operatively coupled to the communications bus, a trusted platform module (TPM) operatively coupled to the communications bus, a BMC, operatively coupled to the communications bus, that is configured to include a remote management agent, and at least one hardware-based non-transitory computer-readable storage device storing computer-executable instructions. The TPM supports a key pair used for public key cryptography. The executed instructions cause the computing device to send a request for remote management instructions from the remote management agent in the BMC to an external cloud-based endpoint. The request is signed with a private key of the key pair to enable the authentication of the remote management agent with the endpoint. In response to the request to the endpoint, remote management instructions are received at the remote management agent. The received remote management instructions are executed at the BMC.

The present cloud-enabled BMC with an integrated remote management agent provides numerous technical improvements over conventional remote management schemes. Remote management is provided in a cost-effective manner for all edge network configurations, including the lowest management layers, down to even a single isolated node without requiring physical access for manual host machine configuration management. The BMC, in an illustrative embodiment, is configured with a REST API (application programming interface) that provides for secure communications using an industry standard protocol to obviate costs associated with hardware-implemented firewalls or dedicated private data connections that are commonly utilized in traditional remote management to mitigate against security risks presented by inbound data connections.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
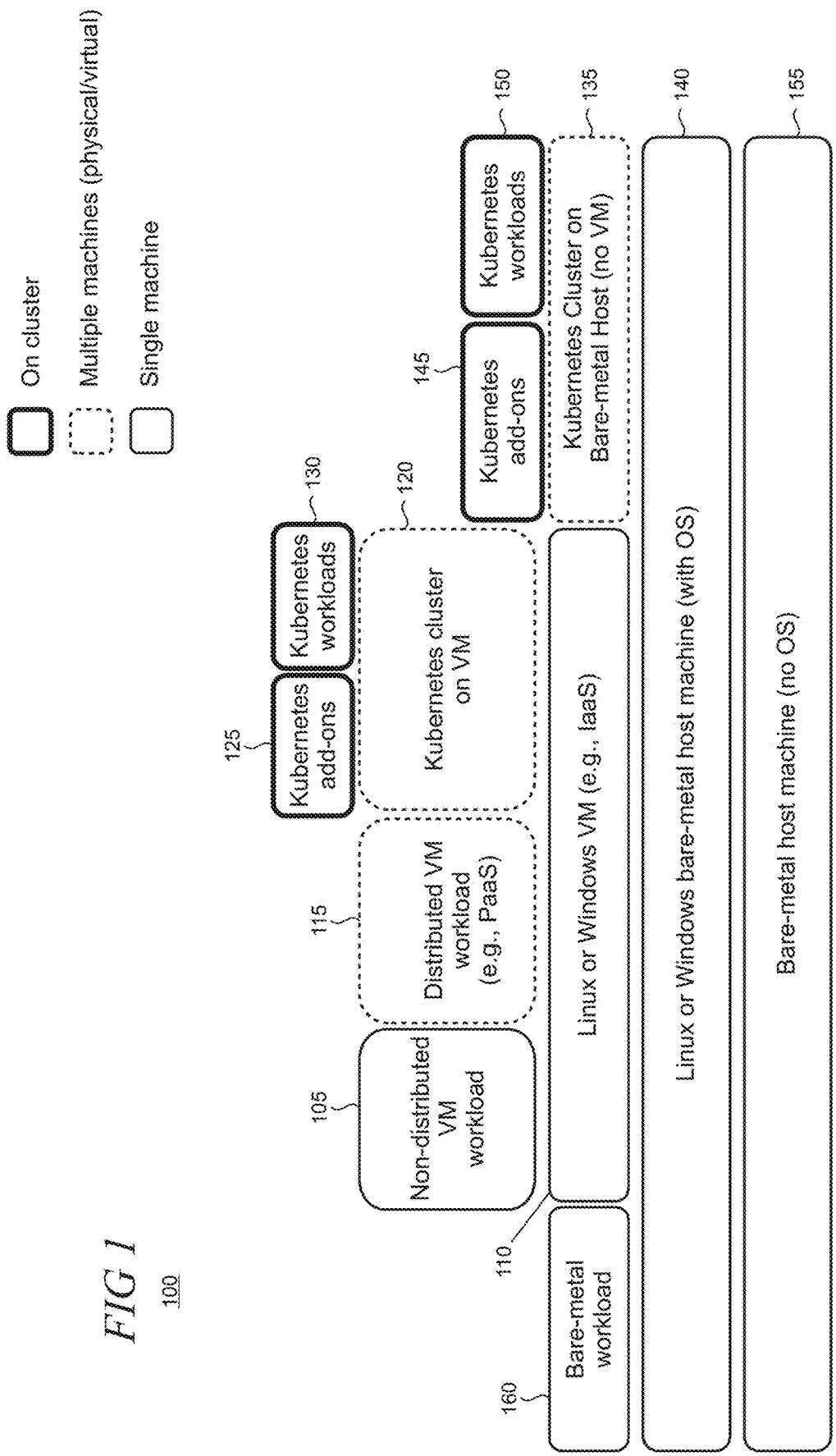
FIG. 1 shows an illustrative layered architecture for management of information technology (IT) resources such as virtual machines (VMs) and clusters.

Customers of cloud-hosted information technology (IT) services typically have interest in cloud-enabled remote management to increase network operating efficiencies and reduce costs. Cloud providers, including hyperscalers providing computing and storage resources using public cloud platforms at enterprise scale, are increasingly supporting remote management of host machines that are located outside core datacenters at network edges in near-edge, far-edge, and/or multi-access edge computing (MEC) computing environments and use cases.

Some remote management solutions utilize management control planes in central and regional datacenter applications that are modified to provide functionality for edge computing hosts. The management control planes often require some amount of local and manual management as well as physical access to the host machines. While such solutions can provide satisfactory results, they are not always scalable, particularly downward to smaller compute/storage clusters where costs can become prohibitive.

Efficient and cost-effective management for clusters of any size and location is conventionally performed by offloading a larger percentage of management from the network edge to the cloud. For example, standalone hardware that is preconfigured with suitable connections to cloud-based management control plane functionalities and resources is available from hyperscalers and other cloud providers. Not all types of workloads are supported using this technique and some customers cannot justify the increased hardware expense by the incremental improvement in operating efficiency.

Other conventional techniques include selective enablement of management for different layers of a management architecture that is utilized for host machines. For example, edge nodes can utilize any generic hardware, but remote management from the cloud is provided only for upper layers while lower layers still require local physical presence. Remote management of lower management layers can also be implemented from the cloud, but typically imposes additional costs to ensure security of the remote connection, for example, using hardware-implemented firewalls or dedicated private data connection.

The present cloud-connected baseboard management controller (BMC) enables remote management of all management layers (including lower layers) of edge-based host machines from the cloud without imposition of costs associated with firewalls and private data connections. A BMC enables out-of-band management of the host machine so that the machine is remotely controllable independently of any operating system (OS) and control system functions. The BMC is configured to expose a RESTful interface, for example, one compliant with the open industry standard Redfish protocol developed by the Distributed Management Task Force (DMTF) to securely receive remote management instructions over a network. BMCs are configurable with sign-in credentials and use either static IP addressing or DHCP (dynamic host configuration protocol). A remote management (RM) agent is incorporated into a BMC operable in the lowest management level to enable some management resources to be offloaded from the network edge to the cloud (e.g., as implemented at a larger regional or central datacenter). The RM agent in the BMC periodically polls (i.e., contacts) a cloud-based endpoint for management instructions for a given node or cluster in the edge network.

The RM agent in the BMC enables creation of an RM-enabled bare-metal server paradigm in which remote management from the cloud is supported at the lowest hardware level of the management architecture. A bare-metal server or host machine is typically implemented as a physical or virtual computer server that is associated with a single service subscription (i.e., customer or tenant) and not shared among multiple tenants. This remote management paradigm is advantageously cost effective for all edge network configurations and topologies down to even a single isolated node while providing the same efficient utilization of network resources and network security as with conventional cloud-based remote management solutions.

Turning now to the drawings, FIG. 1 shows an illustrative layered architecture 100 for management of information technology (IT) services and resources. The components in the architecture are arranged in layers and are implementable on clusters, multiple host machines (physically and/or virtually), and/or on a single host machine. The architecture is hierarchical, in which creation of each component in a given layer is accomplished by the layer below it.

Some management aspects of a component are handled by the component itself. For example, a non-distributed VM (virtual machine) workload 105 runs on a single host machine (e.g., a VM operable as infrastructure as a service (IaaS)) 110 and is created by a process executing on the VM on which that workload runs. The VM is configurable to manage some aspects of the workload, for example control resources it can use, monitor the workload, terminate the workload, etc. The workload itself can also do some self-management, for example, by monitoring its resource usage, or installing needed software/updates for itself.

Distributed VM workloads 115 (e.g., implemented using a platform as a service (PaaS)) and a Kubernetes cluster 120 that are executable on multiple host machines may be similarly created by the VM 110. The Kubernetes cluster creates, in the management layer above it, a Kubernetes add-on component 125 and a Kubernetes workloads component 130.

Another example of layered management shown in FIG. 1 is a Kubernetes cluster 135 that is created by a bare-metal host machine 140 using, for example, a suitable kubeadm tool on all nodes in the cluster. As in the example above, the Kubernetes cluster on the bare-metal host creates, in the management layer above it, a Kubernetes add-on component 145 and a Kubernetes workloads component 150. In this illustrative example, the bare-metal host machine 140 is configured to run either Linux or Windows and itself is created by a bare-metal host machine 155 (having no OS in the layer beneath it). The bare-metal host machine with OS can create a bare-metal workload 160 in the layer above it.

Management tasks can be initiated remotely, for example, via SSH (secure socket shell) to a physical or virtual machine on a host. Such remote initiation avoids a need to have physical access to the host machine. For example, if a Kubernetes cluster is to be created on a VM, then SSH is used to instantiate kubeadm on the VM. Similarly, for creating a workload on a Kubernetes cluster, a REST API (application programming interface) is utilized to talk to an API server for the cluster.

Remote management generally requires an inbound network connection. For example, an SSH port is opened on a host machine. Similarly, for the Kubernetes cluster, the API server requires an inbound connection for remote management. This connection can present a security risk, and thus typically requires the use of firewalls, private data connection, or VPN (virtual private network) to control and/or mitigate such risk which can present undesirable additional costs for a customer.

Figure 2:
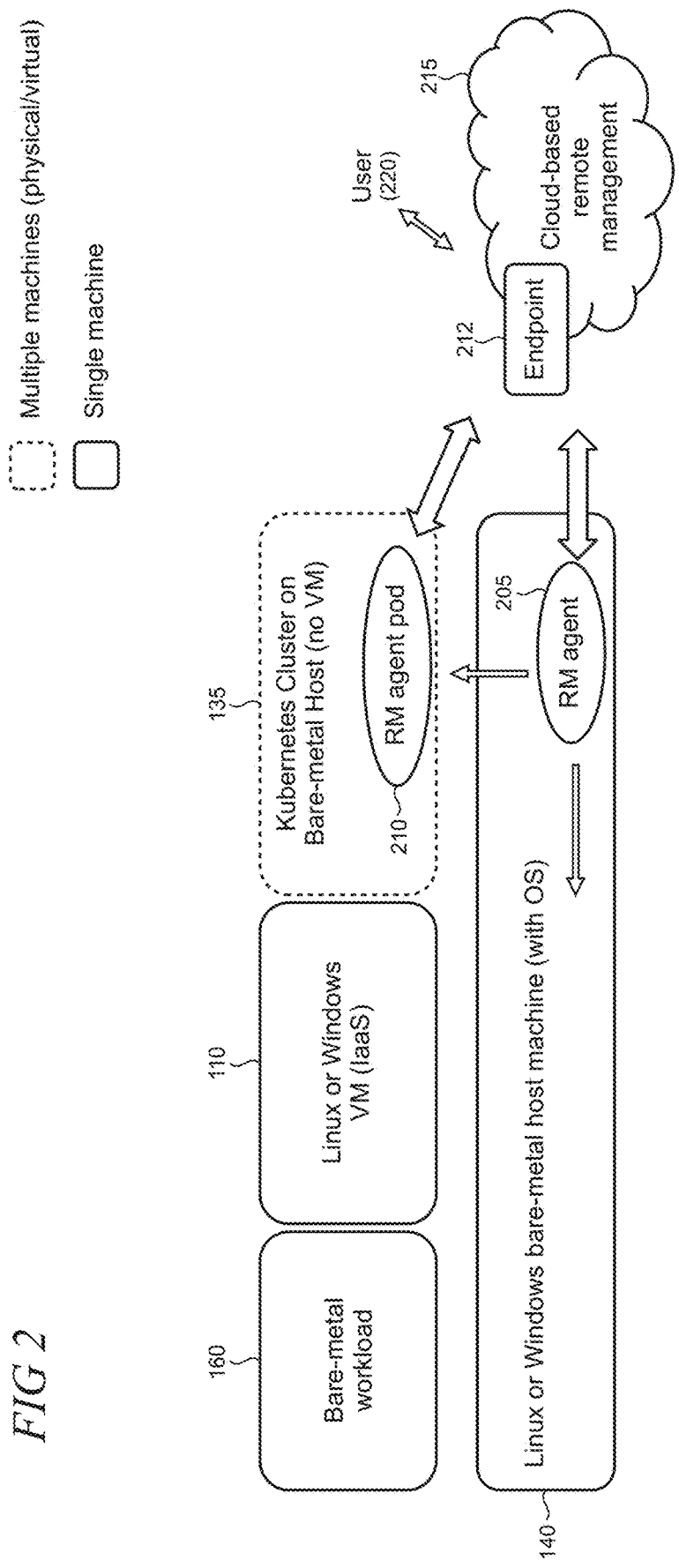
FIG. 2 shows the illustrative use of remote-management (RM) agents instantiated on a host machine and cluster.

The present cloud-connected BMC utilizes an agent that is configured to periodically poll a cloud-based endpoint for management instructions applicable to the components shown in the management architecture 100. The agent is alternatively configurable as appropriate to run on a particular component. For example, as shown in FIG. 2, an RM agent 205 running on a physical bare-metal host machine 140 is instantiated as a daemon service. For the Kubernetes cluster 135, an RM agent 210 is instantiated as a pod. The RM agent enables management of the VM and/or cluster to be implemented as a remote cloud-based service 215 that is exposed to a user (i.e., customer) 220. The service is realizable, for example, as a web-based service or managed application instantiated using the cloud-based endpoint 212 or via a resource provider (RP). The service is configurable to interact with the user to obtain instructions and expose features and services dealing with management of the customer's network and services/resources supported thereon. The RM agent at the network edge thus listens for instructions from the user at the endpoint and then implements tasks at the VM/cluster, as appropriate, in response.

The RM agent (e.g., agent 205 or 210) is configured with credentials to enable it to access IT resources associated with a subscription of a customer. For example, the RM agent is assigned an identity using a service principal in accordance with RBAC to support communications with the endpoint 212 and receive management instructions from the user 220. In some cases, the RM agent interacts with a resource provider (RP), or is configured with appropriate extensions, to facilitate performance of the remote management tasks.

The RM agent is configurable to install software which can advantageously enable it to manage a VM or cluster directly. For example, when the RM agent executes the SSH instruction kubeadm, a host machine joins a Kubernetes cluster. Once the Kubernetes cluster is created, an RM agent can be installed on the cluster itself as a pod to then allow the cluster to be RM-enabled as well. This workflow provides an RM-enabled lower layer in the management architecture 100 (FIG. 1) the capability to create an RM-enabled upper layer. Remote management control planes can thus be conveniently instantiated in edge-located host machines and clusters without requiring additional security hardware or connectivity such as VPNs or private data connections.

Figure 3:
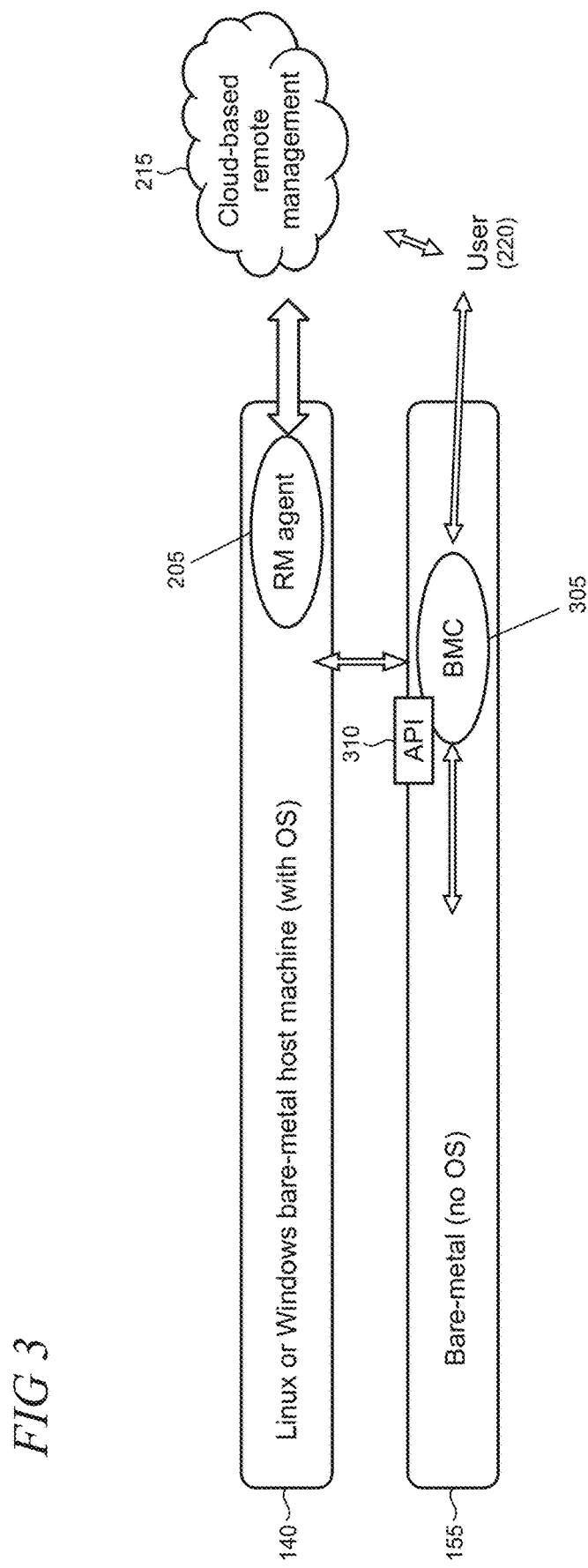
FIG. 3 shows an illustrative baseboard management controller (BMC) instantiated on a bare-metal host machine.

With conventional remote management techniques, the lowest layer of the architecture 100 (FIG. 1) supporting remote management is one in which an OS is installed. Thus, remote management is conventionally applicable only to upper management layers while management of lower layers typically requires physical access of a user to a host machine to allow secure provisioning of a lowest-level bare-metal host. As shown in FIG. 3, using a BMC 305 eliminates the need for physical access by exposing an API 310 to manage the host machine, installing an OS, and operating the machine. In an illustrative example, the API is implemented as a Redfish API with which the user may remotely install an OS image from a virtual drive (e.g., an ISO disk image). In some implementations, the OS image includes an RM agent having suitable credentials to allow the host machine to be RM-enabled immediately upon bootup.

Figure 4:
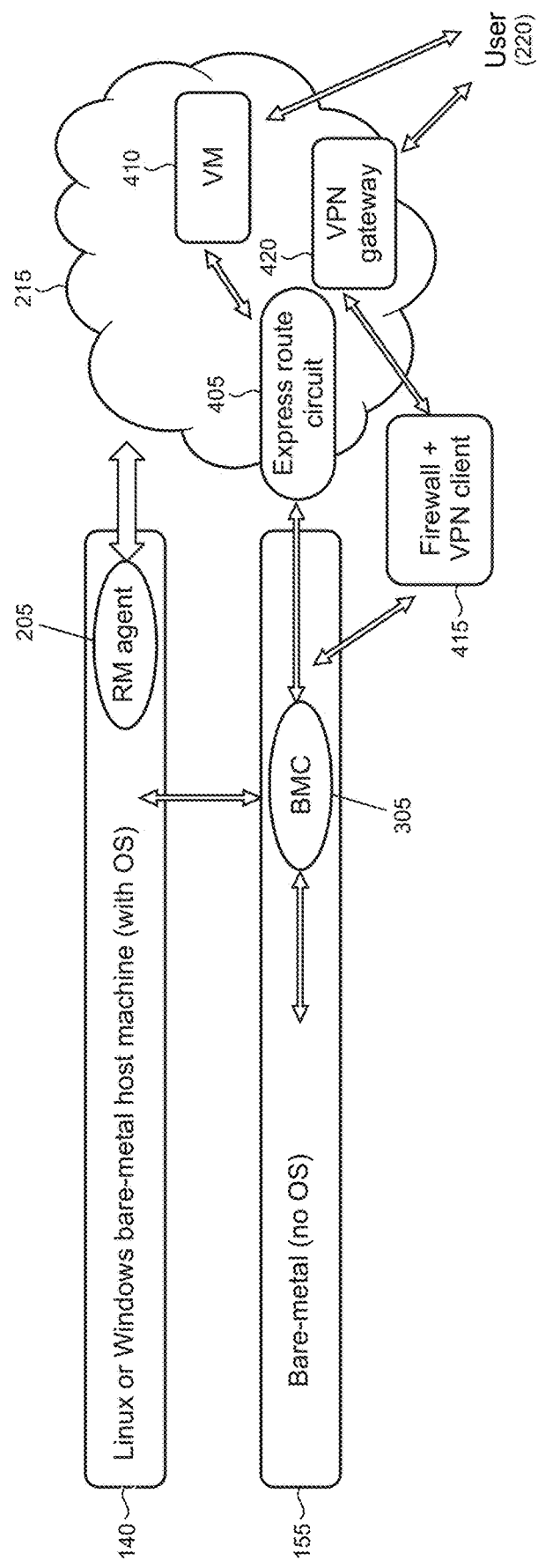
FIG. 4 shows illustrative alternative communication paths between a BMC and a user of a remote management service.

The BMC 305 itself is not RM-enabled and therefore network connectivity needs to be established for it. FIG. 4 shows illustrative communication paths over the cloud network between the BMC and the user 220. An express route circuit 405 (i.e., a private data connection) is utilizable, for example, when connecting to a VM 410. Alternatively, a VPN connection that is typically implemented using a VPN client and firewall 415 and a VPN gateway 420 is utilizable to provide BMC with suitable network connectivity. Both alternatives can provide connectivity with satisfactory security but may be cost prohibitive for networks that have a relatively small number of nodes.

Figure 5:
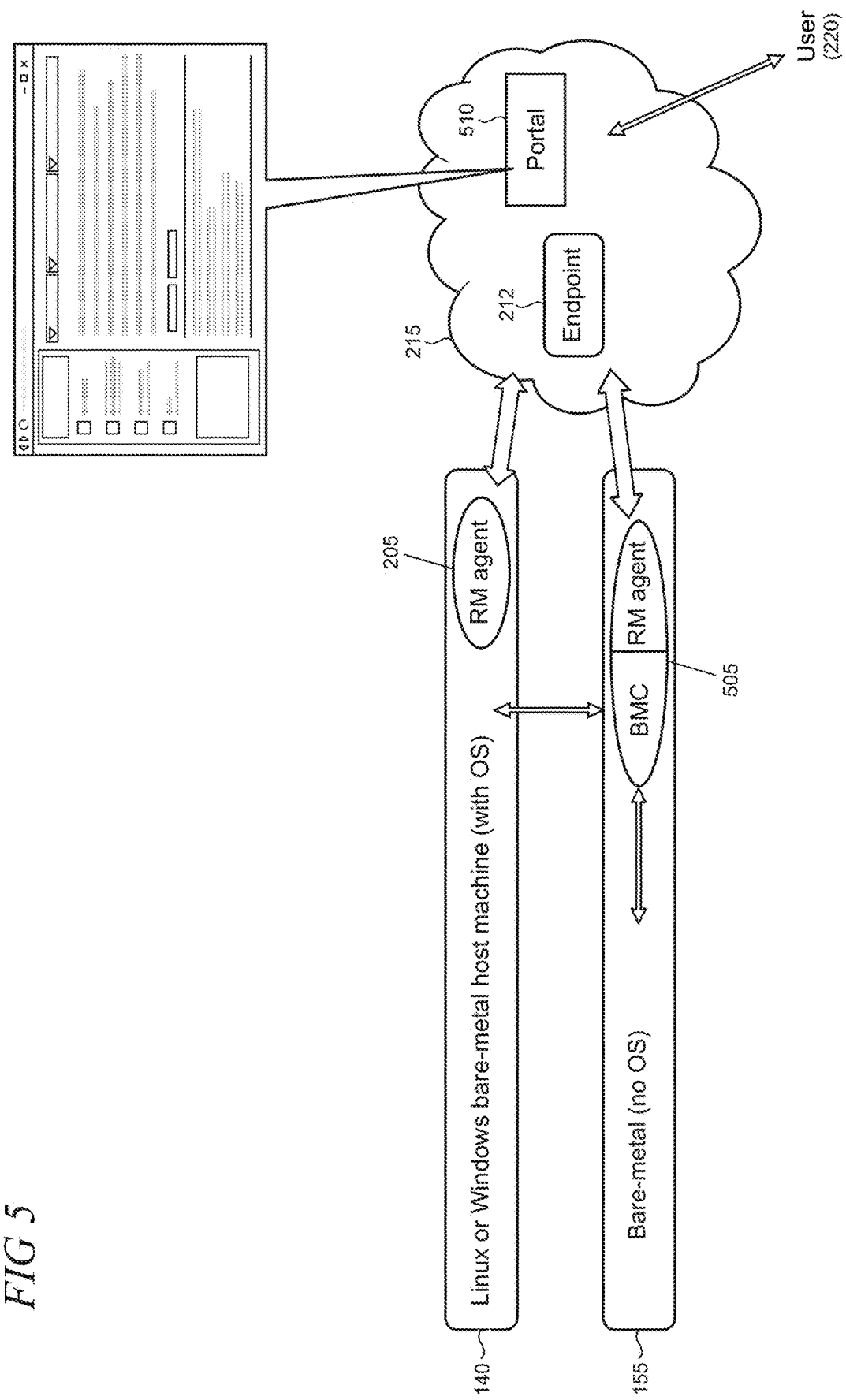
FIG. 5 shows an illustrative BMC that is adapted to incorporate an RM agent directly.

FIG. 5 shows an illustrative BMC 505, instantiated in a bare-metal host machine, that is adapted to incorporate an RM agent directly. By incorporating the RM agent into the modified BMC, the requirement for a separate network connection to the BMC is eliminated. Instead, the RM agent is configured to poll the endpoint 212 in the cloud-based remote management service 215 to receive remote management instructions. The remote management service exposes a portal 510 supporting a graphical user interface (GUI) configured to provide information and various controls to the user 220 to manage the customer's network resources and services. The portal facilitates the user's monitoring of network status and enables management commands to be created for implementation by the RM agent. The portal is implemented as a web-based experience in this example, but may be alternatively incorporated, for example, into other cloud-based applications or tools associated with a customer's existing subscription for cloud-based services.

Figure 6:
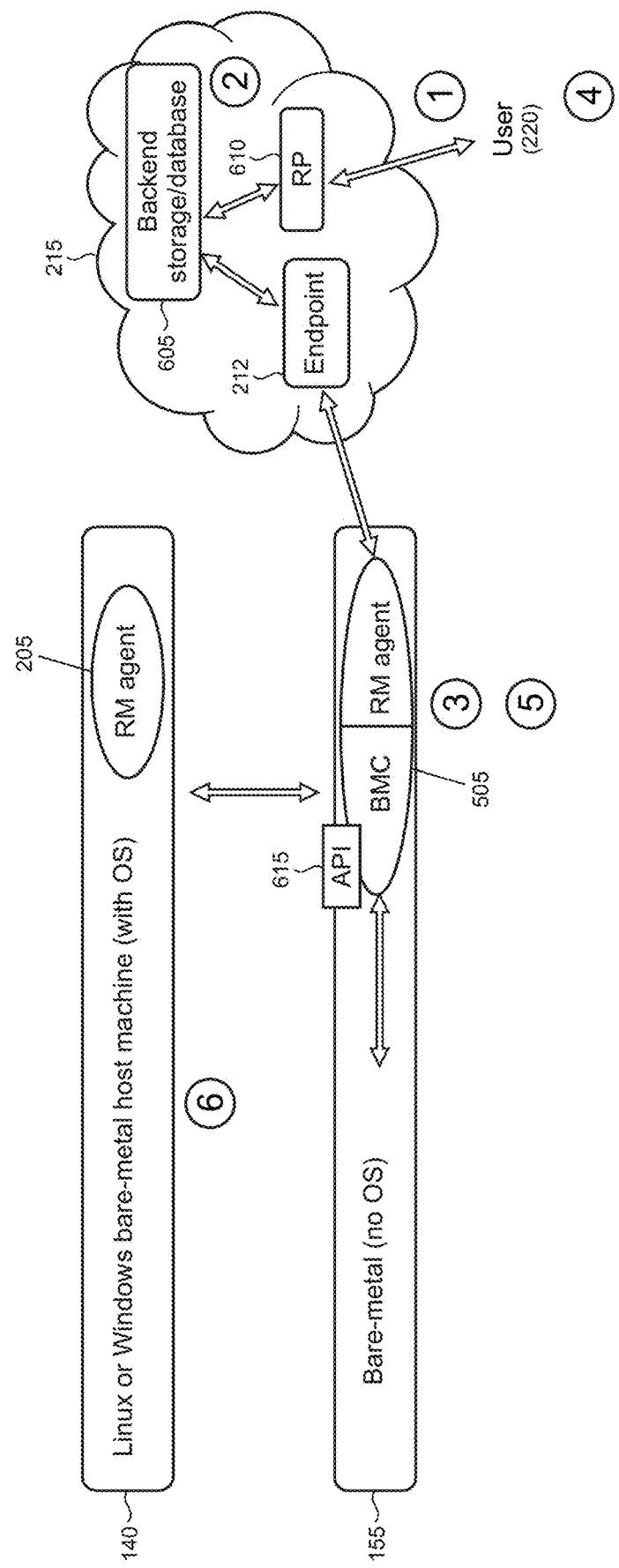
FIG. 6 shows an illustrative workflow for configuring a host machine for cloud-connected remote management.

FIG. 6 shows an illustrative workflow for configuring a host machine for cloud-connected remote management in accordance with the present principles. In step 1 of the workflow, a user 220 claims a host machine as part of an existing subscription for cloud services. The claim is facilitated by utilization of a unique ID that is associated with a machine's BMC. For example, a MAC (media access control) address of a network interface supported by the BMC may be utilized. A trusted platform module (TPM) in the host machine uses public key cryptography including a public key of a public-private keypair that is shared with the cloud service as part of the claim process. In scenarios in which the MAC address does not provide a sufficiently large address space, a random address that is subject to a hashing function may be utilized to create a secure unique code. The code is provided to a host machine customer who can subsequently enter the code to claim the machine.

At step 2 of the workflow, the host machine is registered by the service 215 with the user's subscription, information for which being stored on a backend storage and database 605. An appropriate error message is generated in situations in which a BMC/host machine is already claimed with another subscription. At step 3, the host machine is powered up at the edge site. The RM agent in the BMC 505 executes a continuous polling loop which communicates with the endpoint 212. The RM agent establishes its identity with the endpoint by signing communications using the private key of the keypair of the TPM.

At step 4 of the workflow, the user 220 works through the portal 510 (FIG. 5) to provide management instructions for the host machine using, in this illustrative example, an RP 610. An API 615 exposed by the BMC 505 enables the instructions to be exchanged through polling between the BMC and endpoint 212 over a secure connection (e.g., using HTTPS (hypertext transfer protocol secure) GET). As the API is a RESTful API (e.g., Redfish), it can embed the HTTP call and POST it to the RP. The instructions can include both standard management instructions to the BMC and non-standard instructions that are used to control settings of the RM agent such as polling intervals.

At step 5, upon receiving the remote management instructions, the RM agent in the BMC 505 passes the HTTP call to the BMC using the API. The RM agent executes the instruction at step 6. For example, the instruction could entail installing an OS image (that is prebuilt with an RM agent) into the host machine to enable the machine to be RM-enabled upon boot up.

Figure 7:
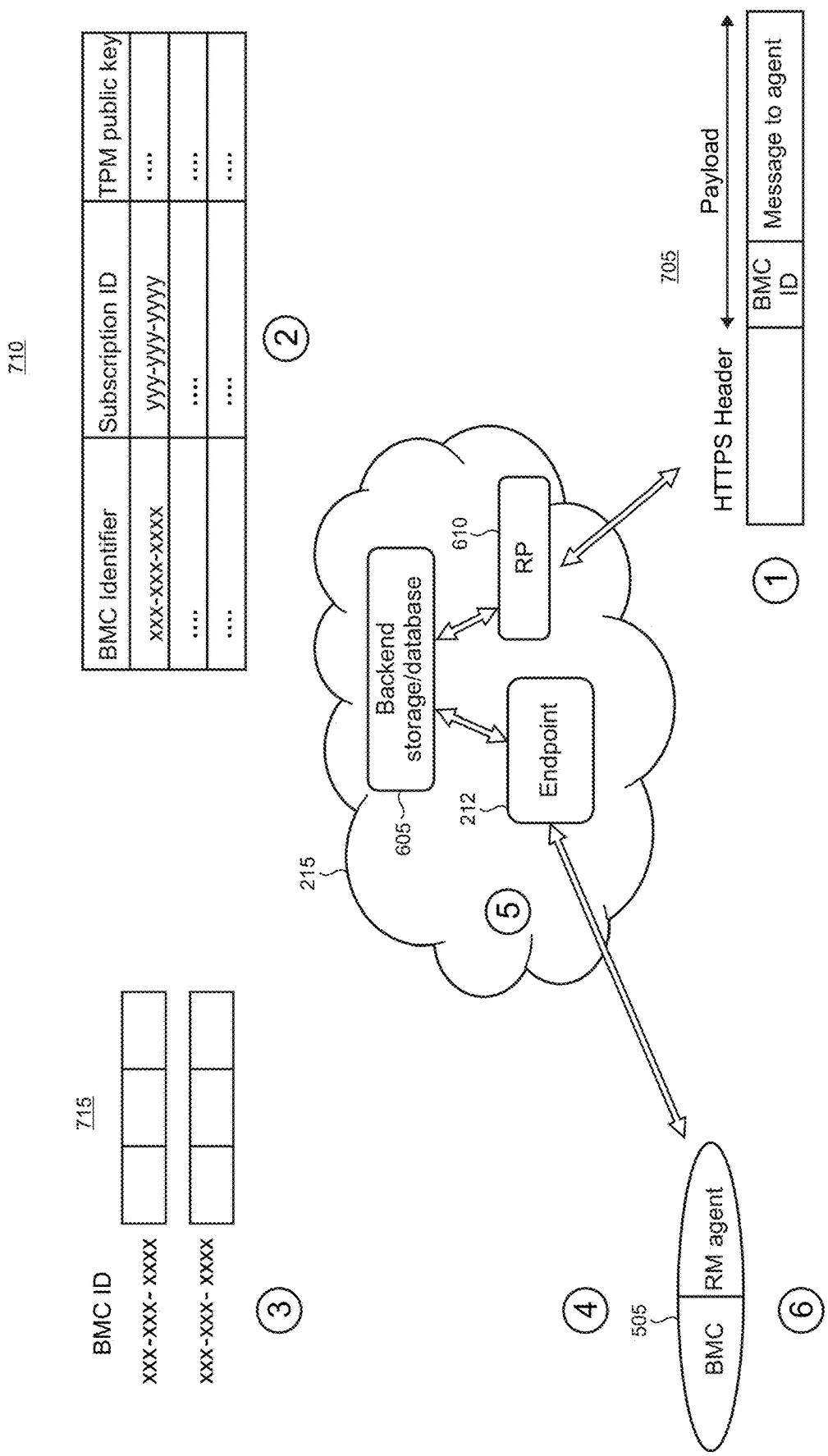
FIG. 7 shows an illustrative remote management instruction flow from a user to a BMC via an integrated RM agent.

The backend storage and database 605 is configurable as a queue of commands for each host machine or cluster. It retrieves commands and then executes them on the BMC as detailed in FIG. 7 which shows an illustrative remote management instruction flow from a user to a BMC via its integrated RM agent.

At step 1 of the instruction flow, a REST API call is made to the RP 610. Standard RBAC (role-based access control) and oauth processes are utilizable to authenticate the user and verify that the user has proper permissions to perform actions on the resource being specified. A call to the BMC 505 is formed into a standard HTTP message 705 which the BMC understands. This entire HTTP packet is embedded as the payload. This portion of the payload is prefixed with the BMC ID onto which it is to be executed. Instructions directly to the RM agent are specified using a pre-specified API. Other metadata may also be present as needed. Messages to the RM agent may be standard instructions (which are forwarded to the BMC) or non-standard instructions.

At step 2, the RP 610 handling a request first verifies an oauth token and RBAC permission by consulting a table 710 used to relate the BMC ID, subscription ID, and the host machine's TPM's public key to ensure that the BMC ID being specified exists and is being managed by this subscription. At step 3, if the BMC request passes muster, then the payload is extracted, and the request (an HTTP request) is added to a queue 715 corresponding to the BMC ID. One queue is used for each BMC ID.

At step 4, the RM agent on the BMC 505 implements a poll loop by sending GET requests to the endpoint 212. Each request sent by the RM agent uses HTTPS with a certificate signed by the TPM's private key to authenticate itself. At step 5, the endpoint verifies the signature, and if it passes, obtains the next instruction in the BMC instruction queue and sends it. At step 6, once the RM agent receives it, it executes the instruction, which could be, for example, to install/re-install the OS. The OS image itself can be sent to the RM agent for installation. Similarly, if the specified HTTP instruction to the BMC returns a response (e.g., a BMC instruction to get the power state (on/off) of the host machine), the RM agent can write this response into a queue or a log for retrieval by the user.

As noted above, the instructions received by the RM agent can include non-standard instructions that are arranged to address various issues. For example, non-standard instructions may include: 1) modifying a polling endpoint to point to an endpoint that is associated with a subscription of a user (to lighten loading on a commonly utilized endpoint); 2) adding additional polling endpoints; 3) deleting endpoints; 4) changing polling intervals (to lighten endpoint loading and/or improving polling response time); 5) polling using a long-lived (e.g., keep-alive) HTTP connection; 6) redirecting the RM agent to initiate a bidirectional websocket connection with the endpoint. The long-lived HTTP connection or the bidirectional websocket connection can be open for a certain duration of time to enable an RM agent to continuously "watch" an endpoint for continuous instructions and provide continuous responses thereto. For example, a dashboard of power usage or processor temperature is displayed on the portal 510 (FIG. 5). When the user is done with this monitoring, the keep-alive HTTP connection is closed.

Figure 8:
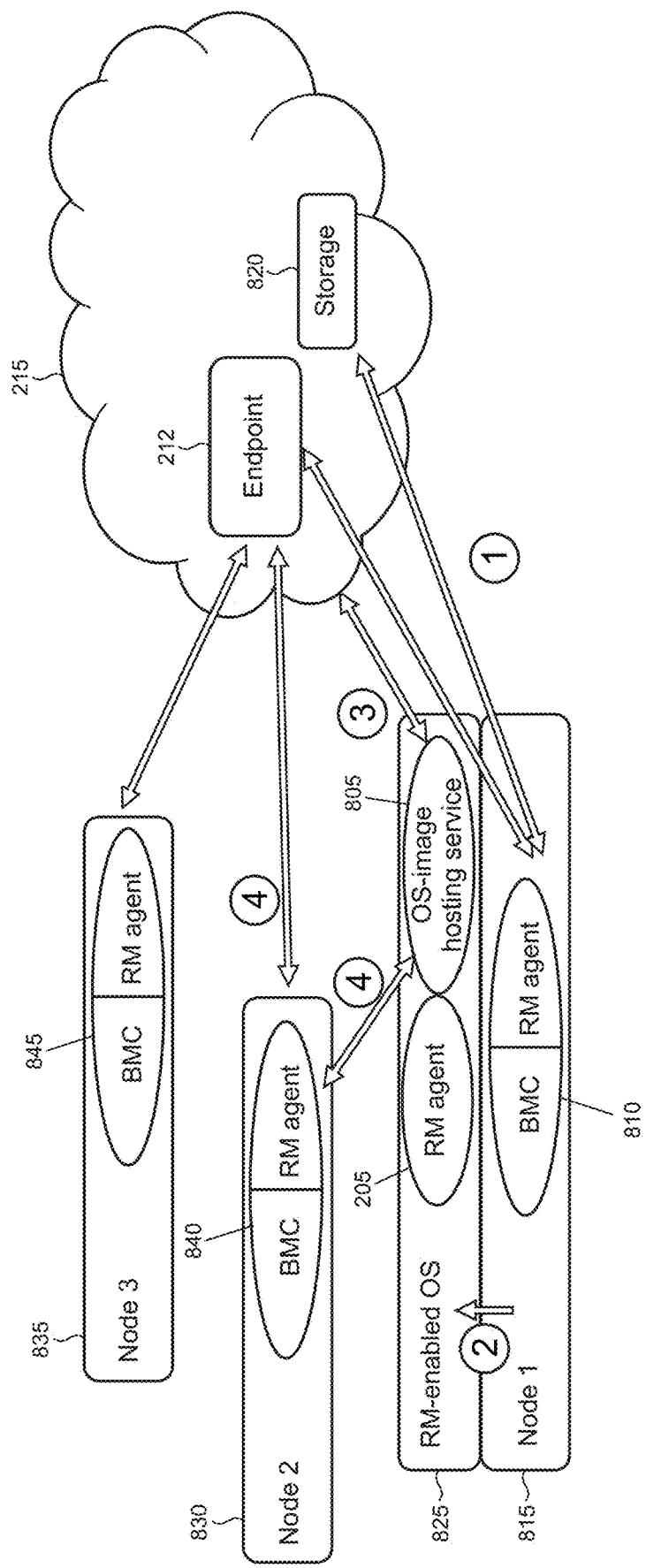
FIG. 8 shows an illustrative local server arranged for caching and hosting operating system (OS) images.

FIG. 8 shows an illustrative local server 805 arranged for caching and hosting OS images. Local caching is utilized in a cluster to help manage bandwidth usage in some implementations. At step 1, the RM agent integrated in the BMC 810 in node 1 (815) is operated to poll for instructions from the endpoint 212. It receives instructions to install an OS along with a download URL (uniform resource locator) for a suitable OS image. The download URL is short-lived and points to a location maintained on a cloud-based storage 820.

At step 2, node 1 (815) installs the OS which includes an RM agent to thereby support an RM-enabled host machine 825. At step 3, node 1 receives management instructions to start the OS-image hosting server 805. At step 4, nodes 2 and 3 (respectively indicated by reference numerals 830 and 835) receive instructions from the endpoint 212 at their respective RM agents 840 and 845 to install the OS. However, rather than retrieve the OS image from the cloud-based storage 820, their download URL points instead to the local server.

Figure 9:
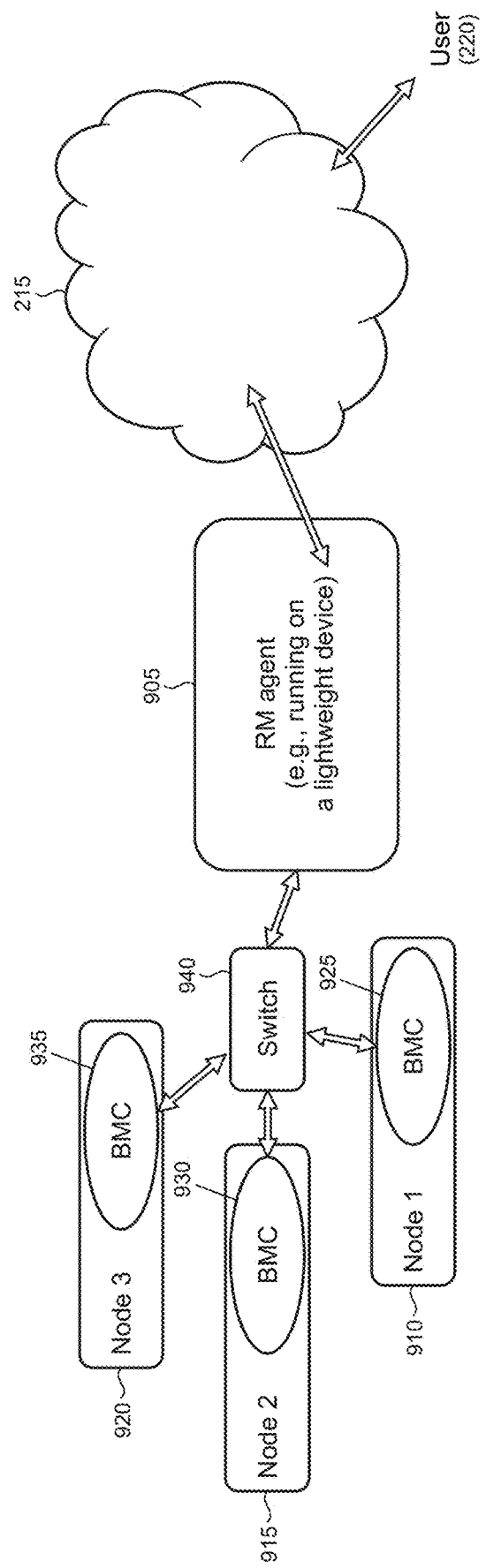
FIG. 9 shows an illustrative alternative arrangement for a single standalone instance of an RM agent supporting multiple nodes of a cluster.

FIG. 9 shows an illustrative alternative arrangement for a single standalone instance of an RM agent 905 supporting multiple nodes 910, 915, and 920 of an edge-based cluster. In this alternative arrangement, an inexpensive and lightweight computing device, such as a Raspberry Pi device, is configured with the RM agent which serves as the agent for each of the respective BMC 925, 930, and 935 in the nodes acting through a switch 940. Rather than provide each BMC with its own unique ID, as discussed above, the RM agent 905 is configured with an ID that is realized, for example, using a manually configured cryptography key, using an ID facilitated by a TPM (if the lightweight device is equipped with a TPM), or using an ID that is assigned by a cloud service provider (e.g., an Azure service principal for Azure cloud services supported by Microsoft Corporation).

In the standalone RM agent implementation, the RM agent runs in the OS of the lightweight device rather than being implemented in hardware with the BMC, as in the illustrative examples discussed above. In addition, the BMCs in the nodes served by the standalone RM agent do not require modification.

Figure 10:
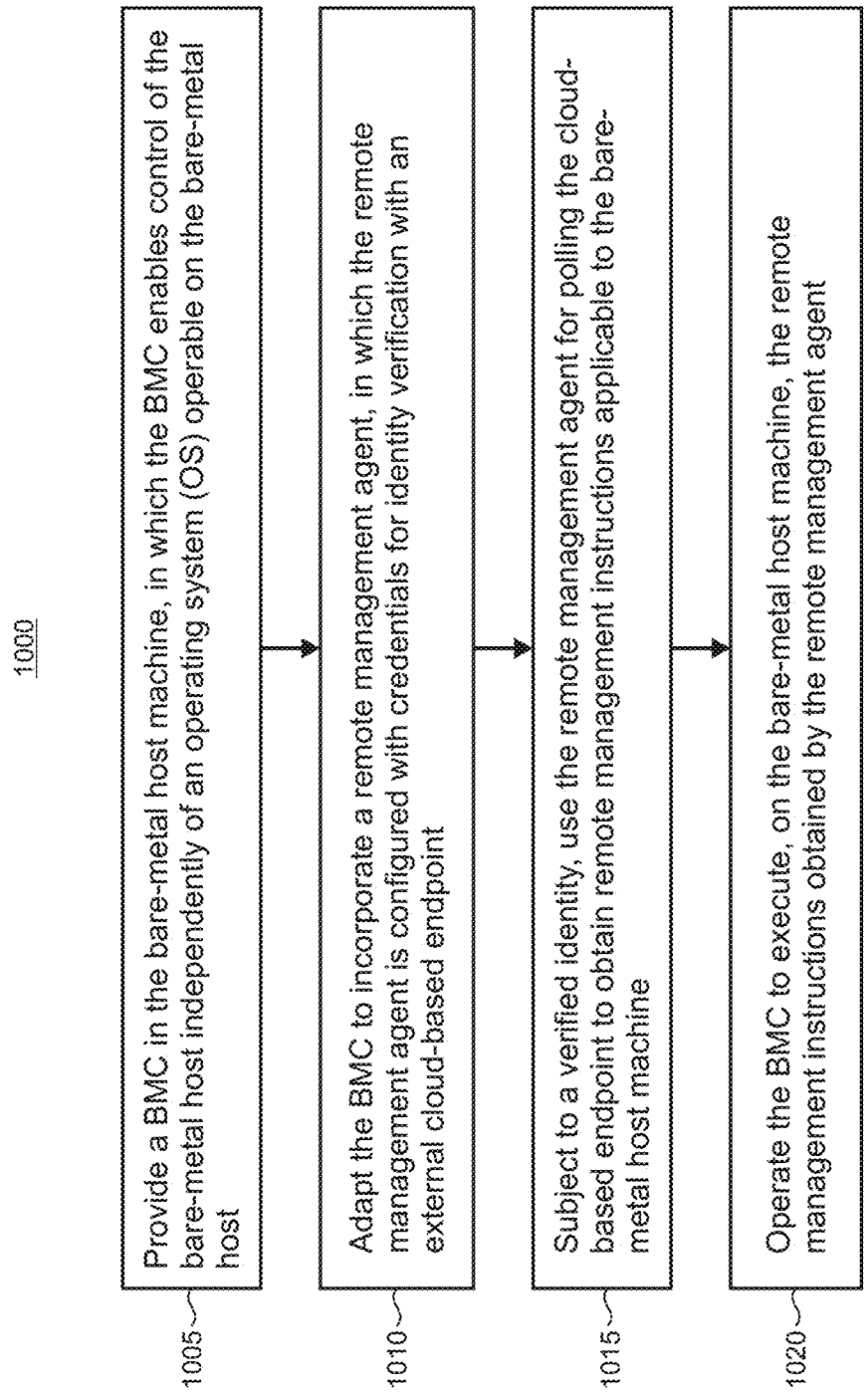
FIGS. 10, 11, and 12 show illustrative methods that may be performed when implementing the present cloud-connected baseboard management controller.

FIG. 10 is a flowchart of an illustrative method 1000 performable, in an illustrative embodiment, by a bare-metal host machine. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1005 includes providing a baseboard management controller (BMC) in the bare-metal host machine, in which the BMC enables control of the bare-metal host independently of an OS operable on the bare-metal host. Block 1010 includes adapting the BMC to incorporate a remote management agent, in which the remote management agent is configured with credentials for identity verification with an external cloud-based endpoint. Block 1015 includes, subject to a verified identity, using the remote management agent for polling the cloud-based endpoint to obtain remote management instructions applicable to the bare-metal host machine. Block 1020 includes operating the BMC to execute, on the bare-metal host machine, the remote management instructions obtained by the remote management agent.

Figure 11:
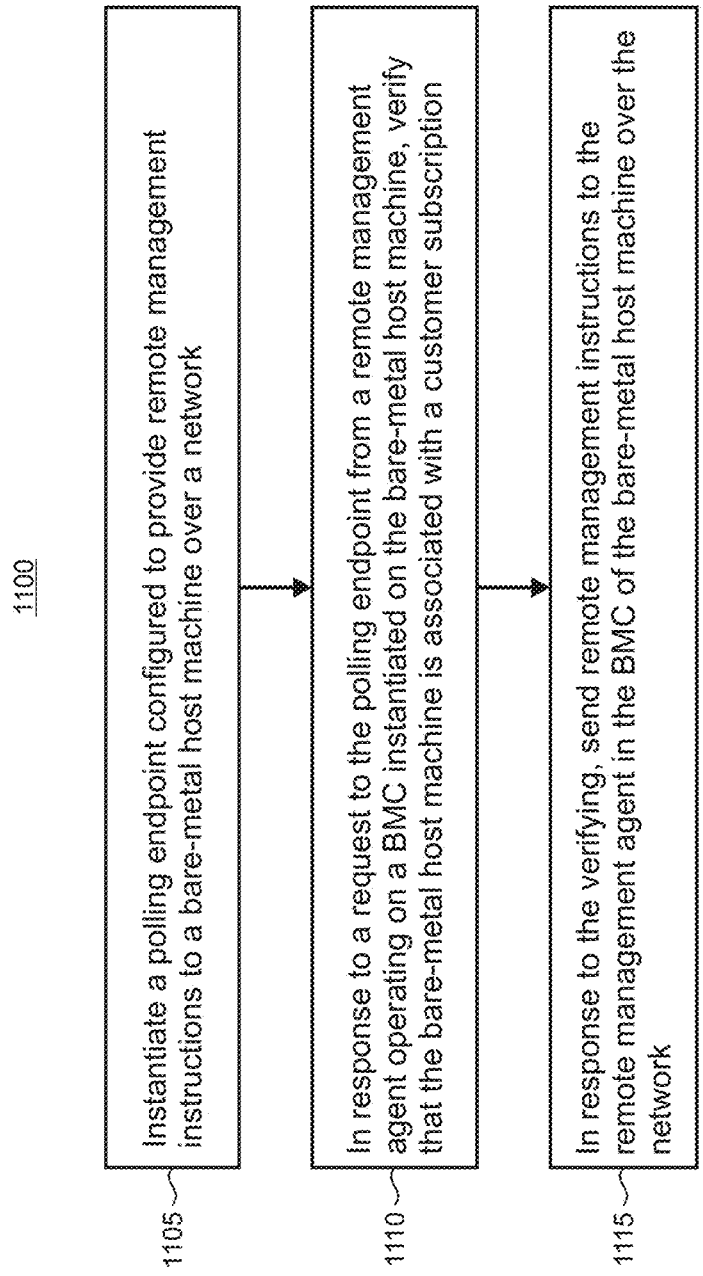

FIG. 11 is a flowchart of an illustrative method 1100 performable, in an illustrative example, by a computing device such as a server in a cloud-based datacenter. Block 1105 includes instantiating a polling endpoint configured to provide remote management instructions to a bare-metal host machine over a network. Block 1110 includes, in response to a request to the polling endpoint from a remote management agent operating on a baseboard management controller (BMC) instantiated on the bare-metal host machine, verifying that the bare-metal host machine is associated with a customer subscription. Block 1115 includes, in response to the verifying, sending remote management instructions to the remote management agent in the BMC of the bare-metal host machine over the network.

Figure 12:
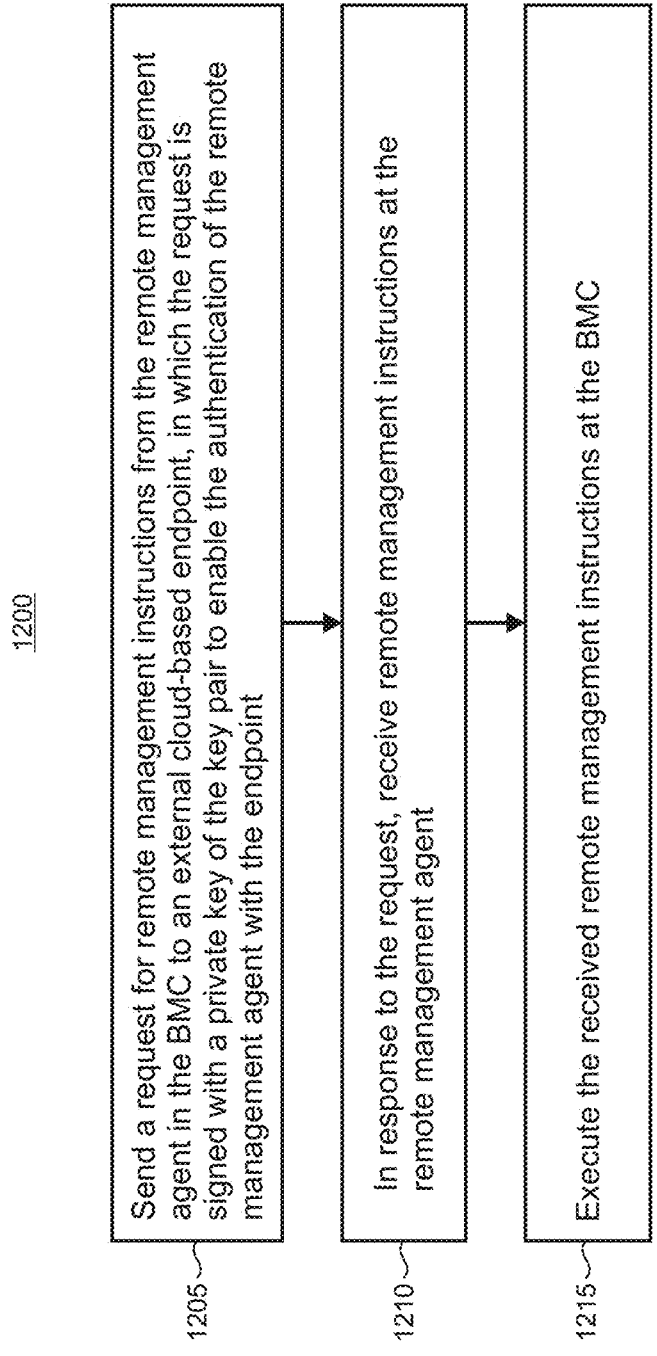

FIG. 12 is a flowchart of an illustrative method 1200 performable, in an illustrative embodiment, by a computing device that is operated as a bare-metal host machine. Block 1205 includes sending a request for remote management instructions from the remote management agent in the BMC to an external cloud-based endpoint, in which the request is signed with a private key of the key pair to enable the authentication of the remote management agent with the endpoint. Block 1210 includes, in response to the request, receiving remote management instructions at the remote management agent. Block 1215 includes executing the received remote management instructions at the BMC.

Figure 13:
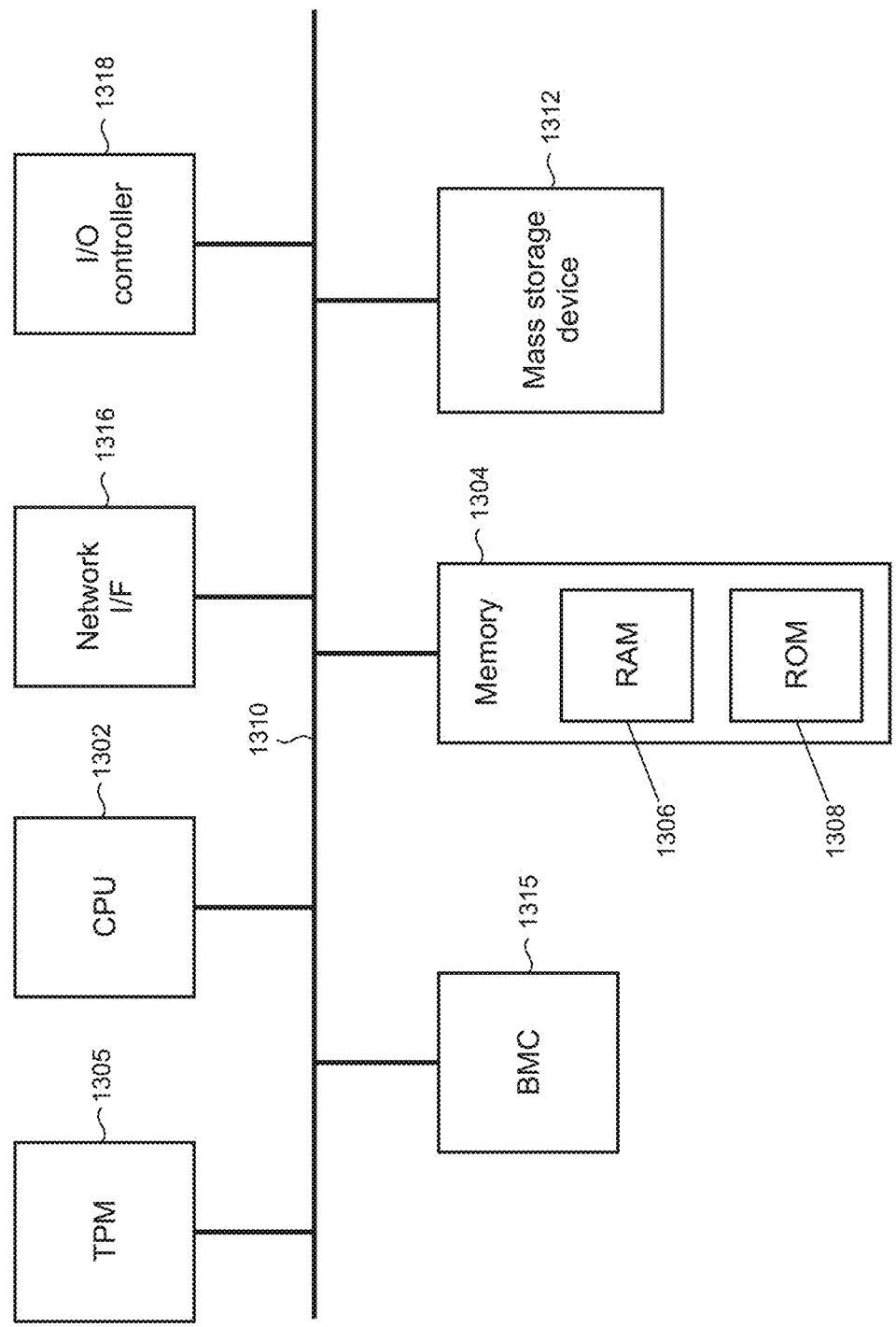
FIG. 13 is a block diagram of an illustrative server or computing device that may be used at least in part to implement the present cloud-connected baseboard management controller.

FIG. 13 shows an illustrative architecture 1300 for a computing device, such as a server, capable of executing the various components described herein for a cloud-connected BMC. The architecture 1300 illustrated in FIG. 13 includes one or more processors 1302 (e.g., central processing unit, dedicated AI chip, graphics processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

The architecture 1300 includes a TPM 1305 that is designed to provide hardware-based, security-related functions. A TPM chip is a secure crypto-processor that is designed to carry out cryptographic operations. The chip includes multiple physical security mechanisms to make it tamper-resistant, and malicious software is unable to tamper with the security functions of the TPM. Some of the advantages of using TPM technology are, for example: 1) Generate, store, and limit the use of cryptographic key; 2) Use it for device authentication by using the TPM's unique RSA key, which is burned into the chip; and 3) Help ensure platform integrity by taking and storing security measurements of the boot process.

The most common TPM functions are used for system integrity measurements and for key creation and use. During the boot process of a system, the boot code that is loaded (including firmware and the operating system components) can be measured and recorded in the TPM. The integrity measurements can be used as evidence for how a system started and to make sure that a TPM-based key was used only when the correct software was used to boot the system.

TPM-based keys can be configured in a variety of ways. One option is to make a TPM-based key unavailable outside the TPM. This is good to mitigate phishing attacks because it prevents the key from being copied and used without the TPM. TPM-based keys can also be configured to require an authorization value to use them. If too many incorrect authorization guesses occur, the TPM will activate its dictionary attack logic and prevent further authorization value guesses. Different versions of the TPM are defined in specifications by the Trusted Computing Group (TCG).

The architecture 1300 includes a BMC 1315. A BMC is a specialized device that monitors the state of a host machine (e.g., a server computer). The BMC provides remote control of server hardware, retrieves status data, and receives notifications about critical errors and other hardware status changes. A script or application that monitors a remote server can obtain data from the server either in-band, through the remote operating system, or out-of-band, directly from the BMC.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, control devices such as buttons and switches or electronic stylus (not shown in FIG. 13). Similarly, the input/output controller 1318 may provide output to a display screen, user interface, a printer, or other type of output device (also not shown in FIG. 13).

It may be appreciated that the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
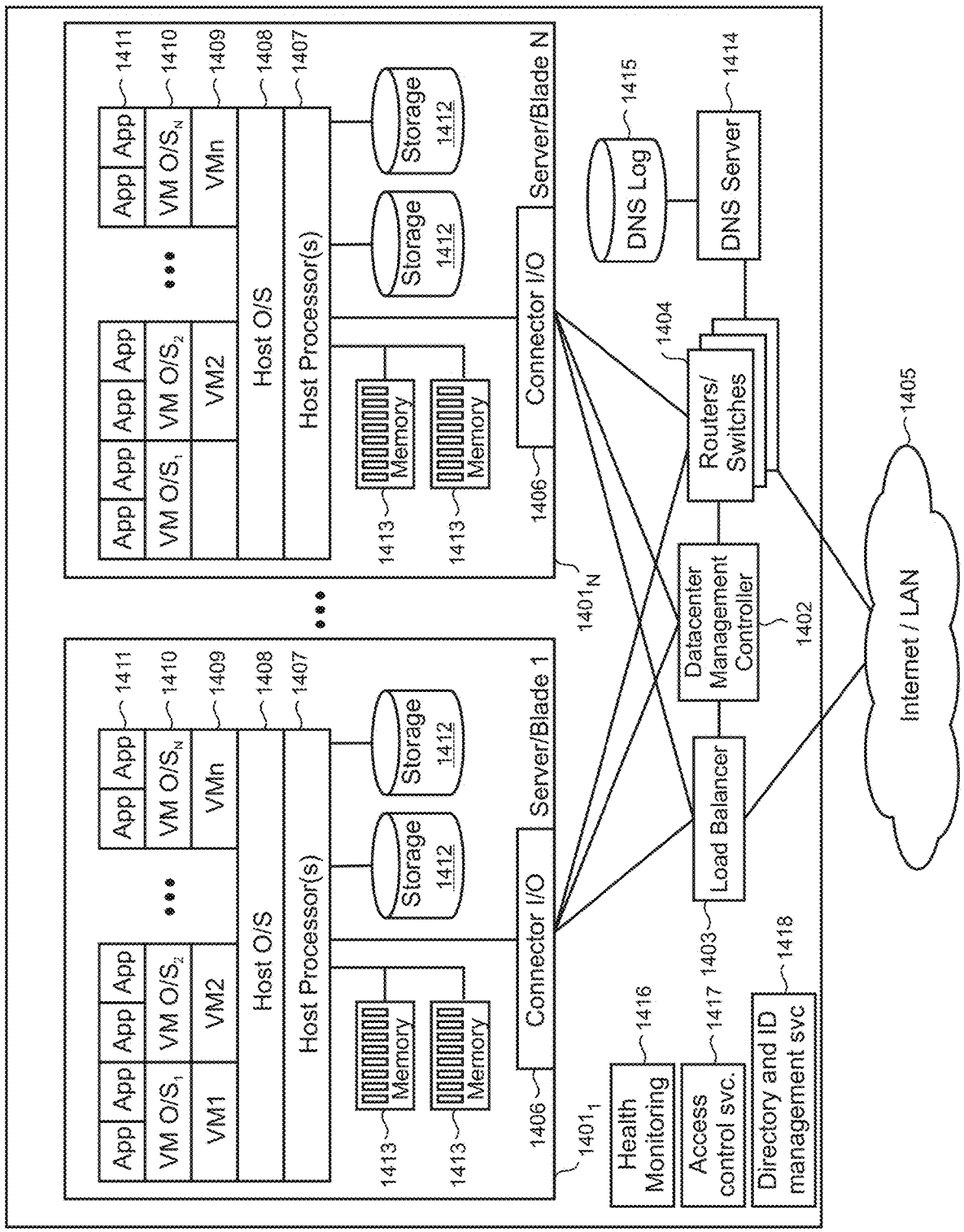
FIG. 14 is a block diagram of an illustrative datacenter that may be used at least in part to implement the present cloud-connected baseboard management controller.

FIG. 14 is a high-level block diagram of an illustrative datacenter 1400 that provides cloud computing services or distributed computing services that may be used to implement the present cloud-connected BMC. Datacenter 1400 may incorporate one or more of the features disclosed in the DCs shown in the drawings and disclosed in the accompanying text. A plurality of servers 1401 are managed by datacenter management controller 1402. Load balancer 1403 distributes requests and computing workloads over servers 1401 to avoid a situation wherein a single server may become overwhelmed. Load balancer 1403 maximizes available capacity and performance of the resources in datacenter 1400. Routers/switches 1404 support data traffic between servers 1401 and between datacenter 1400 and external resources and users (not shown) via an external network 1405, which may be, for example, a local area network (LAN) or the Internet.

Servers 1401 may be standalone computing devices, and/or they may be configured as individual blades in a rack of one or more server devices. Servers 1401 have an input/output (I/O) connector 1406 that manages communication with other database entities. One or more host processors 1407 on each server 1401 run a host operating system (O/S) 1408 that supports multiple virtual machines (VM) 1409. Each VM 1409 may run its own O/S so that each VM O/S 1410 on a server is different, or the same, or a mix of both. The VM O/Ss 1410 may be, for example, different versions of the same O/S (e.g., different VMs running different current and legacy versions of the Windows® operating system). In addition, or alternatively, the VM O/Ss 1410 may be provided by different manufacturers (e.g., some VMs running the Windows® operating system, while other VMs are running the Linux® operating system). Each VM 1409 may also run one or more applications (App) 1411. Each server 1401 also includes storage 1412 (e.g., hard disk drives (HDD)) and memory 1413 (e.g., RAM) that can be accessed and used by the host processors 1407 and VMs 1409 for storing software code, data, etc.

Datacenter 1400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1409 on server $1401_1$ to run their applications 1411. When demand for an application 1411 increases, the datacenter 1400 may activate additional VMs 1409 on the same server $1401_1$ and/or on a new server $1401_N$ as needed. These additional VMs 1409 can be deactivated if demand for the application later drops.

Datacenter 1400 may offer guaranteed availability, disaster recovery, and back-up services. For example, the datacenter may designate one VM 1409 on server $1401_1$ as the primary location for the tenant's application and may activate a second VM 1409 on the same or a different server as a standby or back-up in case the first VM or server $1401_1$ fails. The datacenter management controller 1402 automatically shifts incoming user requests from the primary VM to the back-up VM without requiring tenant intervention. Although datacenter 1400 is illustrated as a single location, it will be understood that servers 1401 may be distributed to multiple locations across the globe to provide additional redundancy and disaster recovery capabilities. Additionally, datacenter 1400 may be an on-premises, private system that provides services to a single enterprise user or may be a publicly accessible, distributed system that provides services to multiple, unrelated customers and tenants or may be a combination of both.

Domain Name System (DNS) server 1414 resolves domain and host names into IP addresses for all roles, applications, and services in datacenter 1400. DNS log 1415 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 1416 monitors the health of the physical systems, software, and environment in datacenter 1400. Health monitoring 1416 provides feedback to datacenter managers when problems are detected with servers, blades, processors, or applications in datacenter 1400 or when network bandwidth or communications issues arise.

Access control service 1417 determines whether users are allowed to access particular connections and services provided at the datacenter 1400. Directory and identity management service 1418 authenticates user credentials for tenants on datacenter 1400.

Figure 15:
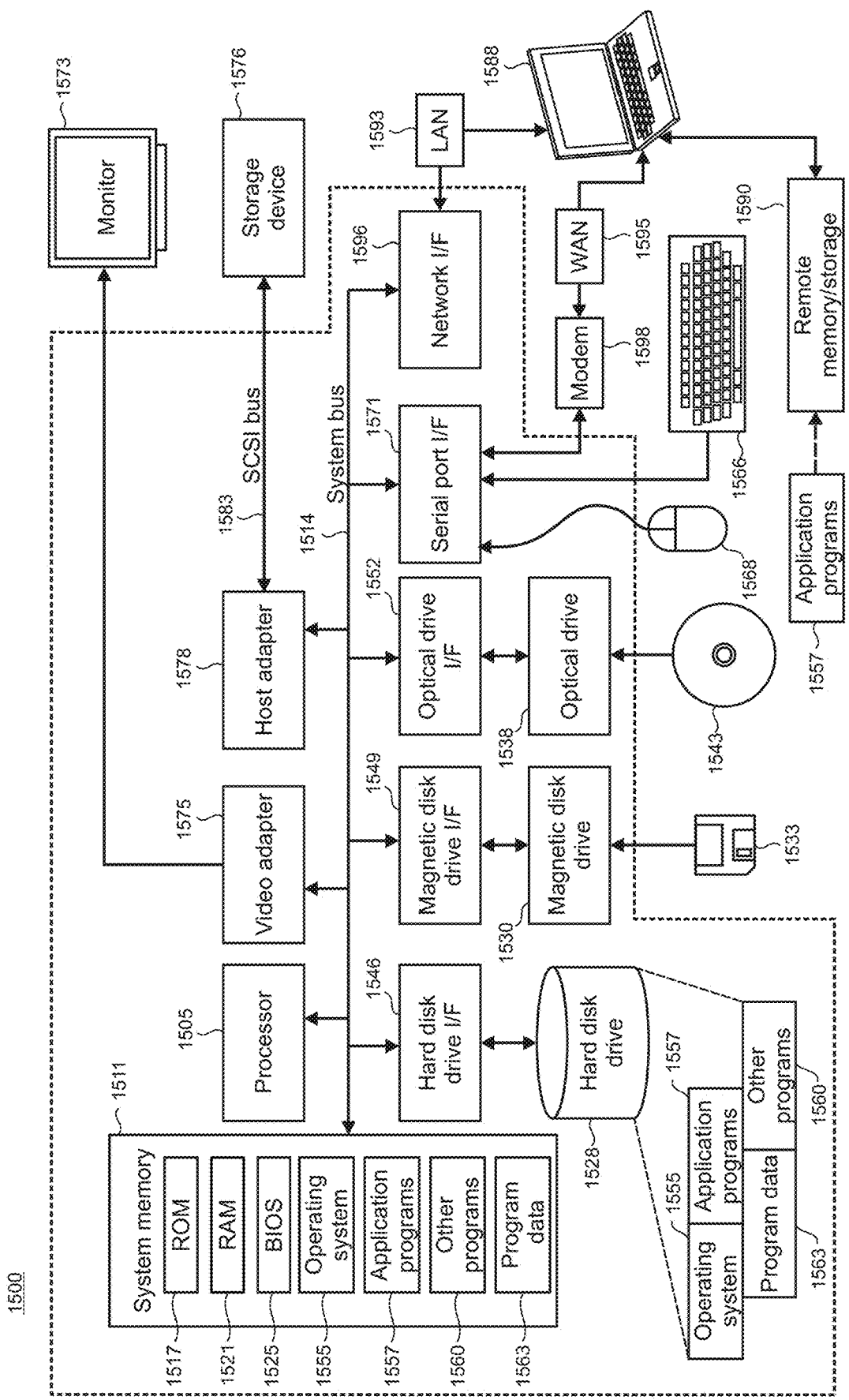
FIG. 15 is a block diagram of an illustrative computer system that may be used at least in part to implement the present cloud-connected baseboard management controller.

FIG. 15 is a simplified block diagram of an illustrative computer system 1500 such as a PC, client machine, or server with which to implement the present cloud-connected BMC. Computer system 1500 includes a processor 1505, a system memory 1511, and a system bus 1514 that couples various system components including the system memory 1511 to the processor 1505. The system bus 1514 may be any of several types of bus structures including a memory bus or memory controller, a peripheral bus, or a local bus using any of a variety of bus architectures. The system memory 1511 includes read only memory (ROM) 1517 and random access memory (RAM) 1521. A basic input/output system (BIOS) 1525, containing the basic routines that help to transfer information between elements within the computer system 1500, such as during startup, is stored in ROM 1517. The computer system 1500 may further include a hard disk drive 1528 for reading from and writing to an internally disposed hard disk (not shown), a magnetic disk drive 1530 for reading from or writing to a removable magnetic disk 1533 (e.g., a floppy disk), and an optical disk drive 1538 for reading from or writing to a removable optical disk 1543 such as a CD (compact disc), DVD (digital versatile disc), or other optical media. The hard disk drive 1528, magnetic disk drive 1530, and optical disk drive 1538 are connected to the system bus 1514 by a hard disk drive interface 1546, a magnetic disk drive interface 1549, and an optical drive interface 1552, respectively. The drives and their associated computer-readable storage media provide non-volatile storage of computer-readable instructions, data structures, program modules, and other data for the computer system 1500. Although this illustrative example includes a hard disk, a removable magnetic disk 1533, and a removable optical disk 1543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present cloud-connected BMC. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1533, optical disk 1543, ROM 1517, or RAM 1521, including an operating system 1555, one or more application programs 1557, other program modules 1560, and program data 1563. A user may enter commands and information into the computer system 1500 through input devices such as a keyboard 1566 and pointing device 1568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1505 through a serial port interface 1571 that is coupled to the system bus 1514, but may be connected by other interfaces, such as a parallel port, game port, or universal serial bus (USB). A monitor 1573 or other type of display device is also connected to the system bus 1514 via an interface, such as a video adapter 1575. In addition to the monitor 1573, personal computers typically include other peripheral output devices (not shown), such as speakers and printers. The illustrative example shown in FIG. 15 also includes a host adapter 1578, a Small Computer System Interface (SCSI) bus 1583, and an external storage device 1576 connected to the SCSI bus 1583.

The computer system 1500 is operable in a networked environment using logical connections to one or more remote computers, such as a remote computer 1588. The remote computer 1588 may be selected as another personal computer, a server, a router, a network PC, a peer device, or other common network node, and typically includes many or all of the elements described above relative to the computer system 1500, although only a single representative remote memory/storage device 1590 is shown in FIG. 15. The logical connections depicted in FIG. 15 include a local area network (LAN) 1593 and a wide area network (WAN) 1595. Such networking environments are often deployed, for example, in offices, enterprise-wide computer networks, intranets, and the Internet.

When used in a LAN networking environment, the computer system 1500 is connected to the local area network 1593 through a network interface or adapter 1596. When used in a WAN networking environment, the computer system 1500 typically includes a broadband modem 1598, network gateway, or other means for establishing communications over the wide area network 1595, such as the Internet. The broadband modem 1598, which may be internal or external, is connected to the system bus 1514 via a serial port interface 1571. In a networked environment, program modules related to the computer system 1500, or portions thereof, may be stored in the remote memory storage device 1590. It is noted that the network connections shown in FIG. 15 are illustrative and other means of establishing a communications link between the computers may be used depending on the specific requirements of an application of the present cloud-connected BMC.

Various exemplary examples of the present cloud-connected BMC are presented by way of limitation and not as an exhaustive list of all embodiments. An example includes a computer-implemented method for remote management of a bare-metal host machine, comprising: providing a baseboard management controller (BMC) in the bare-metal host machine, the BMC enabling control of the bare-metal host independently of an operating system (OS) operable on the bare-metal host; adapting the BMC to incorporate a remote management agent, the remote management agent configured with credentials for identity verification with an external cloud-based endpoint; subject to a verified identity, using the remote management agent for polling the cloud-based endpoint to obtain remote management instructions applicable to the bare-metal host machine; and operating the BMC to execute, on the bare-metal host machine, the remote management instructions obtained by the remote management agent.

In another example, the host machine is physically embodied or virtually embodied in an edge computing environment. In another example, the BMC exposes a REST API (application programming interface) through which remote management instructions are executed in accordance with a standard protocol. In another example, the REST API comprises a Redfish API. In another example, the identity verification comprises presenting, by the remote management agent, a unique identifier associated with the BMC.

A further example includes one or more hardware-based non-transitory computer-readable memory devices storing computer-executable instructions which, upon execution by one or more processors disposed in a computing device in a cloud-based datacenter, cause the computing device to: instantiate a polling endpoint configured to provide remote management instructions to a bare-metal host machine over a network; in response to a request to the polling endpoint from a remote management agent operating on a baseboard management controller (BMC) instantiated on the bare-metal host machine, verify that the bare-metal host machine is associated with a customer subscription; in response to the verifying, send remote management instructions to the remote management agent in the BMC of the bare-metal host machine over the network.

In another example, the computer-executable instructions, when executed by the one or more processors, further cause the computing device to expose a portal to a user of the computing device, the portal configured with controls for the user to configure the remote management instructions or configure the bare-metal host machine for remote management. In another example, the portal is further configured for the user to claim the bare-metal host machine as belonging to the customer subscription. In another example, in which the user configures the remote management instructions for one or more of modifying a polling endpoint, adding a polling endpoint, deleting a polling endpoint, changing a polling interval, establishing a long-lived connection, a keep-alive HTTP connection, or a bidirectional websocket connection with the bare-metal host machine over the network. In another example, the computer-executable instructions, when executed by the one or more processors, further cause the computing device to authenticate the user to the portal or to control access to resources using RBAC (role-based access control). In another example, the one or more hardware-based non-transitory computer-readable memory devices of claim 6 in which the verifying is performed by associating a BMC ID with the customer subscription. In another example, the request to the polling endpoint comprises an HTTPS (hypertext transfer protocol secure) GET message to enable secure communications over the network. In another example, the remote management instructions are included in an HTTP (hypertext transfer protocol) request comprising a BMC ID and a payload, the BMC ID identifying a BMC to execute the remote management instructions. In another example, the computer-executable instructions, when executed by the one or more processors, further cause the computing device to implement a backend database for storing a queue of remote management commands for the base-metal host machine. In another example, the remote management instructions comprise one of instructions conforming to a standardized protocol, or instructions which, when executed, modify a behavior of the RM agent. In another example, the modified behavior comprises one of changing a polling interval, changing a polling endpoint, opening a long-lived HTTP (hypertext transfer protocol) connection, or redirecting to a websocket endpoint.

A further example includes a computing device, comprising: a communications bus; at least one processor operatively coupled to the communications bus; a trusted platform module (TPM) operatively coupled to the communications bus, the TPM supporting a key pair used for public key cryptography; a baseboard management controller (BMC) operatively coupled to the communications bus, the BMC configured with a remote management agent; and at least one hardware-based non-transitory computer-readable storage device having computer-executable instructions stored thereon which, when executed by the least one processor, cause the computing device to: send a request for remote management instructions from the remote management agent in the BMC to an external cloud-based endpoint, the request signed with a private key of the key pair to enable the authentication of the remote management agent with the endpoint, in response to the request, receive remote management instructions at the remote management agent, and execute the received remote management instructions at the BMC.

In another example, the received remote management instructions comprise a pointer to an operating system (OS) image to be downloaded and installed by the BMC on the computing device. In another example, the OS image, when installed on the computing device, instantiates a new instance of a remote management agent having credentials recognized by the endpoint. In another example, the OS image, when installed on the computing device, instantiates a new instance of an endpoint from which instructions are provided to other remote management agents, or with which an OS image is stored.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for remote management of a bare-metal host machine, comprising:
    providing a baseboard management controller (BMC) in the bare-metal host machine, the BMC enabling control of the bare-metal host machine independently of an operating system (OS) operable on the bare-metal host machine;
    adapting the BMC to incorporate a remote management agent, the remote management agent configured with credentials for identity verification with an external cloud-based endpoint;
    subject to a verified identity, using the remote management agent for polling the external cloud-based endpoint to obtain remote management instructions applicable to the bare-metal host machine; and
    operating the BMC to execute, on the bare-metal host machine, the remote management instructions obtained by the remote management agent;
    wherein the obtained remote management instructions comprise a pointer to an operating system (OS) image to be downloaded and installed by the BMC on the bare-metal host machine.

2. The computer-implemented method of claim 1 in which the host machine is physically embodied or virtually embodied in an edge computing environment.

3. The computer-implemented method of claim 1 in which the BMC exposes a REST API (application programming interface) through which remote management instructions are executed in accordance with a standard protocol.

4. The computer-implemented method of claim 3 in which the REST API comprises a Redfish API.

5. The computer-implemented method of claim 1 in which the identity verification comprises presenting, by the remote management agent, a unique identifier associated with the BMC.

6. One or more hardware-based non-transitory computer-readable memory devices storing computer-executable instructions which, upon execution by one or more processors disposed in a computing device in a cloud-based datacenter, cause the computing device to:
  instantiate a polling endpoint configured to provide remote management instructions to a bare-metal host machine over a network;
  in response to a request to the polling endpoint from a remote management agent operating on a baseboard management controller (BMC) instantiated on the bare-metal host machine, verify that the bare-metal host machine is associated with a customer subscription;
  in response to the verifying, send remote management instructions to the remote management agent in the BMC of the bare-metal host machine over the network;
  wherein the remote management instructions comprise a pointer to an operating system (OS) image to be downloaded and installed by the BMC on the bare-metal host machine.

7. The one or more hardware-based non-transitory computer-readable memory devices of claim 6 in which the computer-executable instructions, when executed by the one or more processors, further cause the computing device to expose a portal to a user of the computing device, the portal configured with controls for the user to configure the remote management instructions or configure the bare-metal host machine for remote management.

8. The one or more hardware-based non-transitory computer-readable memory devices of claim 7 in which the portal is further configured for the user to claim the bare-metal host machine as belonging to the customer subscription.

9. The one or more hardware-based non-transitory computer-readable memory devices of claim 7 in which the user configures the remote management instructions for one or more of modifying a polling endpoint, adding a polling endpoint, deleting a polling endpoint, changing a polling interval, establishing a long-lived connection, a keep-alive HTTP connection, or a bidirectional websocket connection with the bare-metal host machine over the network.

10. The one or more hardware-based non-transitory computer-readable memory devices of claim 7 in which the computer-executable instructions, when executed by the one or more processors, further cause the computing device to authenticate the user to the portal or to control access to resources using RBAC (role-based access control).

11. The one or more hardware-based non-transitory computer-readable memory devices of claim 6 in which the verifying is performed by associating a BMC ID with the customer subscription.

12. The one or more hardware-based non-transitory computer-readable memory devices of claim 8 in which the request to the polling endpoint comprises an HTTPS (hypertext transfer protocol secure) GET message to enable secure communications over the network.

13. The one or more hardware-based non-transitory computer-readable memory devices of claim 8 in which the remote management instructions are included in an HTTP (hypertext transfer protocol) request comprising a BMC ID and a payload, the BMC ID identifying a BMC to execute the remote management instructions.

14. The one or more hardware-based non-transitory computer-readable memory devices of claim 7 in which the computer-executable instructions, when executed by the one or more processors, further cause the computing device to implement a backend database for storing a queue of remote management commands for the base-metal host machine.

15. The one or more hardware-based non-transitory computer-readable memory devices of claim 6 in which the remote management instructions comprise one of instructions conforming to a standardized protocol, or instructions which, when executed, modify a behavior of the RM agent.

16. The one or more hardware-based non-transitory computer-readable memory devices of claim 15 in which the modified behavior comprises one of changing a polling interval, changing a polling endpoint, opening a long-lived HTTP (hypertext transfer protocol) connection, or redirecting to a websocket endpoint.

17. A computing device, comprising:
  a communications bus;
  at least one processor operatively coupled to the communications bus;
  a trusted platform module (TPM) operatively coupled to the communications bus, the TPM supporting a key pair used for public key cryptography;
  a baseboard management controller (BMC) instantiated on a bare-metal host machine operatively coupled to the communications bus, the BMC configured with a remote management agent; and
  at least one hardware-based non-transitory computer-readable storage device having computer-executable instructions stored thereon which, when executed by the at least one processor, cause the computing device to:
    send a request for remote management instructions from the remote management agent in the BMC to an external cloud-based endpoint, the request signed with a private key of the key pair to enable the authentication of the remote management agent with the external cloud-based endpoint;
    in response to the request, receive remote management instructions at the remote management agent; and
    execute the received remote management instructions at the BMC;
    wherein the received remote management instructions comprise a pointer to an operating system (OS) image to be downloaded and installed by the BMC on the bare-metal host machine.

18. The computing device of claim 17 in which the OS image, when installed on the bare-metal host machine, instantiates a new instance of a remote management agent having credentials recognized by the external cloud-based endpoint.

19. The computer device of claim 18 in which the OS image, when installed on the bare-metal host machine, instantiates a new instance of an endpoint from which instructions are provided to other remote management agents, or with which an OS image is stored.

* * * * *